United States Patent [19]

Welch

[11] 4,186,958

[45] Feb. 5, 1980

[54] DUMP-TRUCK TAIL GATE SPREAD CHAIN RELEASE DEVICE

[76] Inventor: Charlie R. Welch, 200 W. Strathmore, Pontiac, Mich. 48055

[21] Appl. No.: 724,559

[22] Filed: Sep. 20, 1976

[51] Int. Cl.² .......................................... B62D 25/00
[52] U.S. Cl. .................................... 296/50; 292/264; 296/56; 298/23 S
[58] Field of Search ................. 296/50, 56; 292/264; 49/394; 298/23 R, 23 S, 23 DF, 23 A, 23 B, 23 D

[56] References Cited

U.S. PATENT DOCUMENTS

| 546,102 | 9/1895 | Jenkins | 292/264 |
|---|---|---|---|
| 1,395,028 | 10/1921 | Berg | 298/23 A |
| 1,420,315 | 6/1922 | Herbst | 298/23 R |
| 2,908,529 | 10/1959 | Davidson | 298/23 R |
| 3,720,431 | 3/1973 | Oliver | 292/264 |

Primary Examiner—John A. Pekar
Assistant Examiner—John A. Carroll

Attorney, Agent, or Firm—Gerald R. Hershberger

[57] ABSTRACT

My dump-truck Tail Gate Spread Chain Release has oppositely spaced bearing members mounted to the dump-truck tail gate adjacent the bottom edge thereof. A chain release holding and release toggle member is pivotably mounted between said spaced bearing members. I fasten a cantilevered arm to said pivotable member, extending upwardly therefrom and fastened fixedly but removably to said truck tail gate. The chain is held in a slotted opening in said pivotable member at selective spaced intervals so that the tail gate may be adjusted to any desired position for allowing materials therein to fall from the truck body. When it is desired to release the chain from the weight of the tail gate and materials in the truck, the cantilevered arm is released from the upper portion of the end gate and the pivotable chain holding member is then pivoted downwardly from dead center in the direction of the pull of said chain, allowing said chain to be easily removed from said slotted opening.

3 Claims, 6 Drawing Figures

DUMP-TRUCK TAIL GATE SPREAD CHAIN RELEASE DEVICE

BACKGROUND OF THE INVENTION

1. Field of the Invention

This invention relates generally to vehicles having pivotable tail gates which open at the rearward portion thereof to allow material to be spread during the dumping process which involves tilting the dump body upwardly so that the material slides to the rearward of the tiltable body and more particularly to a tail gate spread chain release means for holding the spreader chain at a set distance for spreading the material but providing easy release of the chain even when the weight of the material in the body is pressing against the tail gate.

2. Description of the Prior Art

Devices of this general character are known in the prior art for securing a tail gate which is releasable at the lower portion thereof in order to dump the contents of the truck body under the tail gate and chain devices have been used to secure the tail gate in a set position with respect to the material in the dump body. However in the known devices such devices are unwieldy and complicated to use and are difficult to operate since they jam when the truck body material weight exerts itself against the bottom of the tail gate. The jamming of the chain requires that the driver of the vehicle climb into the dump-truck and with a shovel or some other means to free the material from the tail gate so that the chain can be released from the tail gate and the tail gate lifted. All of the prior art known to this inventor has this undesirable feature of jamming when the weight of the material falls against the tail gate and if the material for some reason is stuck in the tail gate or frozen therein such as when salt or other caustic materials are being spread it is practically impossible to remove the chain from the locking device without shovelling and exerting a considerable amount of manual and physical labor in removing the material from the tail gate.

SUMMARY OF THE INVENTION

Accordingly the problems and difficulties encountered in the prior art are obviated by the present invention in which I provide a tail gate spread chain holding and release device which is not subject to inclement weather, does not become frozen or unreleasable by weight of the material in the dump-truck and is easily and quickly released so that the tail gate may be released and lifted from the material in the truck body when desired.

An object of my invention is stated in the above ABSTRACT OF DISCLOSURE.

Another and further object of my invention is to provide a tail gate spread chain holding a release device which is readily released for lifting the tail gate of a truck body even when the material in the truck body is weighing or pressing against the tail gate with great force or frozen therein.

It is a further object of this my invention to provide a tail gate spread chain holding and release device wherein the pressure exerted by the force of the material against the tail gate is biased to reduce the pressure on the holding device when the device is in chain locking position and biased to help the device to open to remove said chain when the chain is being unlocked.

It is a further object of this my invention to provide a tail gate spread chain release and holding device utilizing the toggle principal wherein the force on the locking arm means is reduced when the device is locked in chain securing position and the force of the material against the chain is biased to assist in removing the chain from the lock when the locking device is opened.

BRIEF DESCRIPTION OF THE DRAWING

The present invention may be better understood and numerous other features and advantages thereof will become apparent to those skilled in the art by reference to the accompanying drawing wherein like reference numerals refer to like elements in the various figures in which.

DESCRIPTION OF THE PREFERRED EMBODIMENT

Figure 1:
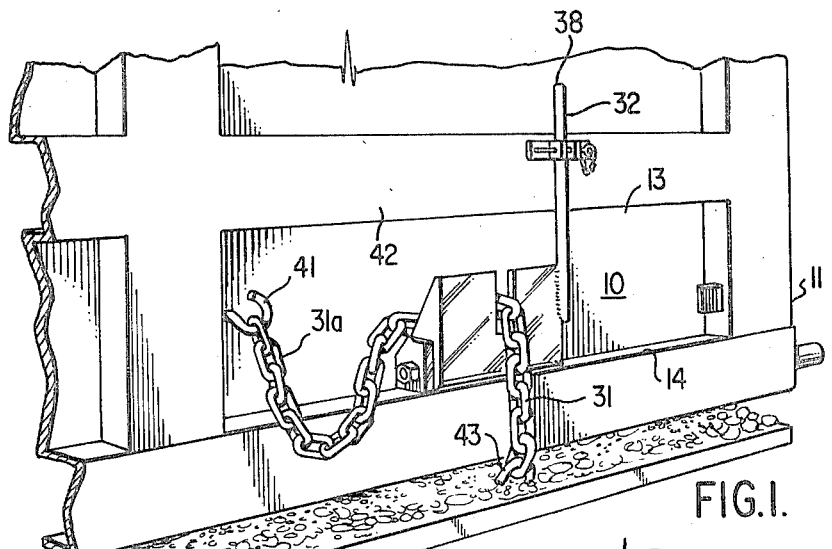
FIG. 1 is a perspective view of my novel tail gate spread chain holding and release device showing the holding and release device mounted to the right-hand side of a dump-truck tail gate.
Figure 2:
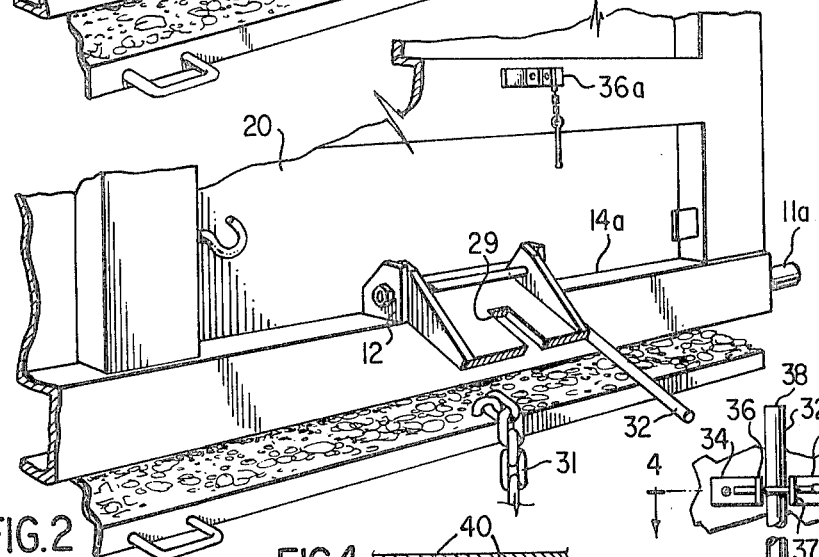
FIG. 2 is a view in the same direction as FIG. 1 showing the tail gate holding a release device in open position with the chain removed.

Referring now in detail to the drawing, and in particular to FIG. 1 and 2. The numeral 10 denotes the tail gate spread chain holding a release device constructed in accordance with my invention. It is shown as mounted on the right-hand side of a dump-truck tail gate 11. The said gate is provided with conventional locking means 11a to secure same tightly to the conventional dump-truck box.

Another of my tail gate spread chain holding and release devices (not shown) is mounted on the left-hand side of said tail gate and is identical to the right-hand side device with the exception that it is left-handed instead of right-handed.

My device includes a hinge bracket 12 fixedly mounted to the lower right-hand margin 14a of said tail gate by means of screws 15 and nuts 14 or by welding if desired.

Said hinge bracket has rearwardly bent flanges 16 and 17 constructed to act as journals.

Axial bores 18 and 19 are formed in said flanges for bearing purposes. Said axial bores are aligned parallel to the rear wall 20 of said tail gate.

A generally "U" shaped securing and releasing member 21 is pivotably mounted between said axial bores by means of forwardly turned flanges or ears 22 and 23 which are provided with axial bores 24 and 25 and held in pivotable relationship with said axial bores 18 and 19 by means of a threaded hinge pin 26 inserted through said bores in said bracket flanges and holder ears and fixedly secured thereto by means of nut 27. Said holding and release member is generally "U" shaped with said flanges 22 and 23 forming the legs, flanges or ears of the "U."

The intermediate portion 28 of said release member is of generally flat, elongated and rectangular outline and when in the locked position is disposed vertically with said flat portion thereof parallel to said wall 20 of said end gate. Said intermediate portion is further provided with an elongated "U" shaped notch or slot 29 having parallel side walls 29a parallel to the hinge bracket flanges 16 and 17 and a bottom transverse wall 30a and an open end at the upper margin 30 of said intermediate portion. Said slot is constructed to receive a tail gate chain 31 across the diameter of said chain so that the next link of the chain which is transverse to the secured link cannot be pulled through said slot. The slot bottom wall 30a is located as closely as possible adjacent said hinge pin 26 to shorten the torque arm and relieve and lessen the torque on said intermediate portion of said release member which tends to rotate said intermediate member in a clockwise direction, so that the force against the chain can be controlled and held manually.

An elongated bar or arm 32 is fixedly mounted or welded to the right-hand edge 33 of said release member. Said arm extends upwardly when in locked position generally parallel to said release member and to said wall 20 of said tail gate. Said arm is constructed to extend upwardly closely adjacent the wall of said tail gate where it is secured upwardly on said tail gate wall above said intermediate member by means of a releasable fastening means 36a which includes spaced arm holding brackets 34 and 35 are mounted on each side of said arm to said tail gate by welding, screws 37a or other fastening means.

Arm holding bracket flanges 36 and 37 are outwardly bent generally normal to said tail gate wall and extend outwardly therefrom a sufficient distance to hold and contain the upper portion 38 of said cantilevered arm between them.

A pin or other fastening means 39 is inserted transversely through axial bores 40 in said arm bracket flanges securing said arm between said pin and said wall so that said arm and said holding and release member are held fixedly but releasably in said vertical position.

The chain 31 is placed in said vertical slot allowing sufficient play therein to allow the tail gate to spread the desired distance when the locking means 11a is released, the dump body is tilted, and the material therein forces itself against said tail gate. The free unused portion of the chain 31a is placed over a hook 41 for storage thereof. The portion of the tail gate to which said arm bracket flanges are fastened usually extends outwardly from wall 20, therefore said arm brackets and said arm are positioned to allow for the difference in height between wall 20 and wall 42 so as to keep said release member substantially vertical when the chain is initially placed in said slot in the vertical locking position.

Figures 3, 5, 6:
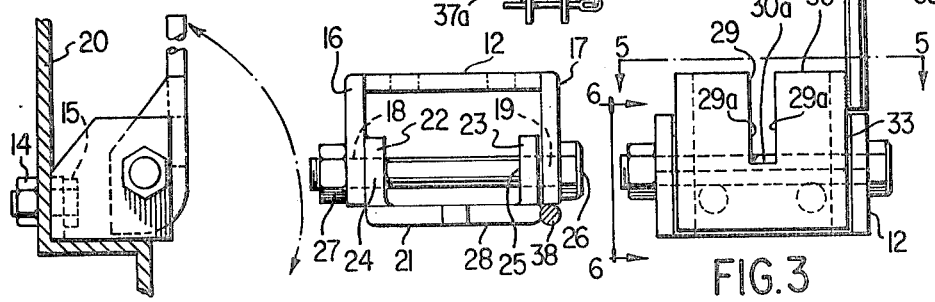
FIG. 3 is an elevational view of my device showing the construction thereof in more detail.
FIG. 5 is a plan view of my device taken along line 5-5 of FIG. 3.
FIG. 6 is an end view taken in the direction of line 6—6 of FIG. 3.
Figure 4:
FIG. 4 is a view taken in the direction of line 4-4 of FIG. 3.

When the dump body is tilted and said intermediate portion is locked by pin 39 with the chain and said slot in vertical position, great pressure is then exerted against said chain by the material in said dump body because the other end 43 thereof is connected to the dump body. However as shown in FIG. 6 the pull or force of the chain is downward and the pull thereof is almost directly against the hinge pin or on dead center over it and therefore there is very little pressure exerted by the chain against said arm 32 tending to rotate said intermediate member. Thus the holding and release member acts as part of a toggle arrangement since when the arm and slot is in the vertical position the pull of the chain is substantially against the pin. However, on releasing the upper arm by removing said pin 39, the arm may be easily rotated manually because the chain weight is directly on the hinge, as the arm is rotated downward the torque arm length, represented by the distance between chain and the hinge pin increases and the pull on the chain decreases thereby controlling the torque on the holding member and assisting in allowing the holding member to be manually revolved to a downward position where said vertical slot is then directed downwardly allowing slack in the chain. With the pressure removed from the chain, the chain is easily removed from said slot.

While there is here shown and described specific embodiments of this invention, the latter is not limited to the exact details of construction set forth, and the invention embraces such changes, modifications and equivalents of the parts and their formation and arrangement as come within the purviews of the appended claims.

What is claimed is:

1. A truck tail gate holding and releasing apparatus comprising a tail gate holder means including a pivotable member having a slot therein pivotably mounted on said tail gate;
   a tail gate chain adapted to be fastened to the bed of a truck having a link thereof placed in said slot for securing said tail gate;
      an elongated cantilevered arm connected to said pivotable member including an extended portion for actuating said pivotable member; and
   latch means mounted on said gate for releasably securing said arm to said gate by said arm extended portion.

2. The truck tail gate holding and releasing apparatus of claim 1, further comprising bracket means for pivotably mounting said pivotable member.

3. A tail gate controlling apparatus for a vehicle dump-body comprising a pivotable holder means mounted on said tail gate having a slot therein and a cantilevered arm extending outwardly therefrom, a portion of said slot being sized to admit the thickness of a chain link but sized less than the width of a link to prevent passage therethrough of a link positioned transverse to the slot;
   a tail gate mounted on said dump-body and a spreader chain associated with said gate;
   gate release means on said body and normally holding a lower portion of said gate closed against said body, a portion of said chain being affixed to said body beneath said tail gate, and a link of said chain being received and retained in said portion of said slot; and latch means mounted on said tail gate above said pivotable holder means for retaining said cantilevered arm in juxtaposition with said tailgate and for maintaining tension between the chain links.

* * * * *